United States Patent
Yamamoto et al.

(10) Patent No.: US 8,827,474 B2
(45) Date of Patent: Sep. 9, 2014

(54) DISPLAY DEVICE HAVING AN IMPROVED VIEWING ANGLE AND PRODUCTION THEREOF

(75) Inventors: Emi Yamamoto, Osaka (JP); Tsuyoshi Maeda, Osaka (JP); Toru Kanno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/805,411

(22) PCT Filed: Apr. 14, 2011

(86) PCT No.: PCT/JP2011/059294
§ 371 (c)(1),
(2), (4) Date: Jan. 4, 2013

(87) PCT Pub. No.: WO2011/162013
PCT Pub. Date: Dec. 29, 2011

(65) Prior Publication Data
US 2013/0094174 A1   Apr. 18, 2013

(30) Foreign Application Priority Data
Jun. 23, 2010   (JP) ................................ 2010-142975

(51) Int. Cl.
| | |
|---|---|
| *F21V 11/00* | (2006.01) |
| *F21V 9/14* | (2006.01) |
| *G02B 5/02* | (2006.01) |
| *G02F 1/1335* | (2006.01) |
| *G02F 1/1333* | (2006.01) |

(52) U.S. Cl.
CPC ..... *F21V 11/00* (2013.01); *G02F 2001/133562* (2013.01); *G02F 1/133524* (2013.01); *G02B 5/0215* (2013.01); *G02F 2001/133311* (2013.01); *F21V 9/14* (2013.01); *G02F 1/133504* (2013.01); *G02F 1/13338* (2013.01)
USPC ....................................... 362/19; 362/311.01

(58) Field of Classification Search
USPC .............. 313/582–587, 44–47; 361/681, 682, 361/688–747
See application file for complete search history.

(56) References Cited

U.S. PATENT DOCUMENTS

| | | | |
|---|---|---|---|
| 5,521,726 A | 5/1996 | Zimmerman et al. | |
| 8,462,292 B2 * | 6/2013 | Parker et al. | 349/62 |

(Continued)

FOREIGN PATENT DOCUMENTS

| | | |
|---|---|---|
| JP | 2000-352608 A | 12/2000 |
| JP | 2004-125824 A | 4/2004 |
| JP | 2007-148185 A | 6/2007 |
| JP | 2008-032756 A | 2/2008 |

(Continued)

OTHER PUBLICATIONS

Official Communication issued in International Patent Application No. PCT/JP2011/059294, mailed on May 17, 2011.

*Primary Examiner* — Tracie Y Green
(74) *Attorney, Agent, or Firm* — Keating & Bennett, LLP (57) ABSTRACT

A display devices includes a light diffusing sheet and a display section. The display section includes a backlight section, and a liquid crystal panel that serves as a liquid crystal display element section. The backlight section includes a light source such as a light emitting diode or a cold-cathode tube, and a light guide plate for guiding, to the liquid crystal display element section, light which is emitted from the light source and is subjected to internal reflection. The light diffusing sheet is configured by forming, on a substrate, a plurality of light diffusing sections each having an inverse tapered shape. In the display device, the light diffusing sheet is provided on a front surface of the display section such that the substrate is located on a light exit surface side of the light diffusing sheet.

10 Claims, 7 Drawing Sheets

(56) References Cited

U.S. PATENT DOCUMENTS

| | | | |
|---|---|---|---|
| 2006/0279953 A1* | 12/2006 | Kim et al. | 362/332 |
| 2007/0201246 A1* | 8/2007 | Yeo et al. | 362/627 |
| 2007/0275215 A1 | 11/2007 | Lu | |

FOREIGN PATENT DOCUMENTS

| | | |
|---|---|---|
| JP | 4129991 B2 | 8/2008 |
| JP | 2009-086682 A | 4/2009 |
| JP | 2009-538452 A | 11/2009 |

* cited by examiner

DISPLAY DEVICE HAVING AN IMPROVED VIEWING ANGLE AND PRODUCTION THEREOF

TECHNICAL FIELD

The present invention relates to (i) a display device including a light diffusing sheet and (ii) a method for producing the display device.

BACKGROUND ART

Recently, display devices have been remarkably researched and developed, and a thin flat panel display (FPD) has been in widespread use instead of a display device employing a cathode-ray tube which was conventionally in widespread use. The FPD includes a display element such as liquid crystal, a light emitting diode (LED), or organic electroluminescence (EL).

The FPD is configured such that light is emitted to a display screen, or light is emitted by, for example, a backlight which is provided behind the display screen (which is provided so as to face a viewer via the display screen). The viewer views the light emitted from the display screen. The display device is designed such that a viewer can view light emitted obliquely from the display screen in the same manner as light emitted straightforwardly from the display screen. That is, the display device is designed such that the viewer does not feel difference between when the viewer obliquely views the display screen and when the viewer straightforwardly views the display screen. However, the design is insufficient. There is a case where a viewer feels a great difference between when the viewer obliquely views the display screen and when the viewer straightforwardly views the display screen though a contrast property is excellent when the display screen is straightforwardly viewed. Therefore, display on the display screen differs depending on a direction in which the viewer views the display screen. That is, the FPD has a problem of deterioration in viewing angle property.

In order to improve the viewing angle property of the FPD, for example, a light diffusing film is provided on a light exit surface of the FPD. This makes it possible for a viewer to view an image in an oblique direction. Examples of the light diffusing sheet include a film whose surface is concavo-convex, and a film containing light diffusing fine particles. The light diffusing sheet subjects light emitted from the backlight to refraction or total reflection in all directions by use of difference in refractive index. The light refracted by the light diffusing sheet is diffused from the surface of the light diffusing sheet in many directions, and is emitted toward a viewer. Usage of the light diffusing sheet makes it possible for a viewer to view an image on the display device from various directions. It is therefore possible to develop a display device which displays an image which (i) does not differ from a case where the image is straightforwardly viewed to a case where the image is obliquely viewed and (ii) less changes depending on a viewing angle.

Figure 11:
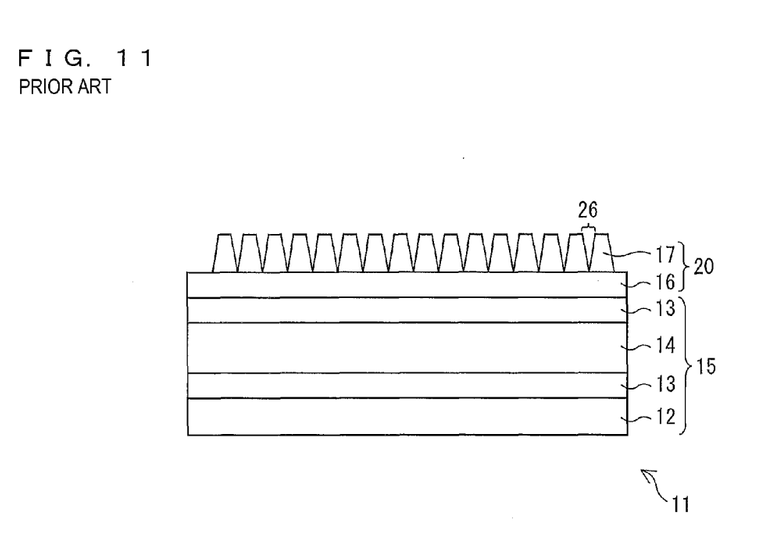
FIG. 11 is a cross-sectional view of a conventional display device.

For example, Patent Literature 1 discloses a display device including a light diffusing sheet provided on a side of the display device which side is to be viewed. In the light diffusing sheet, a plurality of grooves are formed in juxtaposition with one another, each of which grooves has a substantially V-shaped cross section. FIG. 11 illustrates the display device including the light diffusing sheet disclosed in Patent Literature 1. As illustrated in FIG. 11, a light diffusing sheet 20 of a display device 11 disclosed in Patent Literature 1 has formed a plurality of waveguides 17 any adjacent ones of which are separated by a corresponding one of a plurality of substantially V-shaped grooves (air gap regions) 26. Each of the plurality of waveguides 17 has an incident surface and a light exit surface that is distal to the incident surface. The incident surface has a surface area larger than that of the light exit surface. The waveguide 17 has a tapered shape which tapers such that the light exit surface has a surface area smaller than that of the incident surface. Therefore, angle distribution of light emitted from the light exit surface is broader than that of light which enters the incident surface. As such, according to the technique disclosed in Patent Literature 1, it is possible to realize the display device 11 having an excellent viewing angle property, and high contrast and vividness.

CITATION LIST

Patent Literature

Patent Literature 1
Japanese Patent Application Publication, Tokukai, No. 2007-148185 A (Publication Date: Jun. 14, 2007)

SUMMARY OF INVENTION

Technical Problem

However, there is the danger that the waveguides are destroyed by an external stimulus in a case where, as illustrated in FIG. 11, (i) the corresponding one of the grooves 26 between any adjacent ones of the waveguides 17 is an air gap and (ii) the light diffusing sheet 20 including the waveguides 17 and the grooves 26 is provided on the forefront surface of the display device 11 disclosed in Patent Literature 1.

Specifically, in a case where the display device, in which the light diffusing sheet whose surface has a minute structure is provided on the forefront surface of the display device, is transported or assembled, the minute structure of the light diffusing sheet will be contaminated by dust etc. or will be damaged by an external stimulus. This makes it impossible for the light diffusing sheet to demonstrate performance as originally designed. This will also cause deterioration in optical property such as reflectivity as time goes on.

The present invention was made in view of the problems, and an object of the present invention is to provide (i) a display device capable of preventing a minute structure on a surface of a light diffusing sheet provided on the forefront surface of the display device from, for example, being contaminated by dust etc. or from being damaged during transporting or assembling the display device and (ii) a method for producing the display device.

Solution to Problem

In order to attain the object, a display device of the present invention is configured to be a display device in which a light diffusing sheet is provided on a light exit surface side of a display screen, the light diffusing sheet including: a substrate; and a plurality of light diffusing sections, provided on the substrate, each having an inverse tapered shape, the light diffusing sheet being provided on the display screen such that the substrate is located on the light exit surface side.

According to the configuration, the light diffusing sheet, in which the plurality of light diffusing sections each having the inverse tapered shape are formed on the substrate, is provided on the light exit surface of the display screen such that the substrate is located on the light exit surface side. It follows that the substrate covers a forefront surface of the display device.

In a conventional case where a light diffusing sheet in which any adjacent ones of light diffusing sections are separated by an air gap is provided on a forefront surface of a display device, the light diffusing sections are in danger of being destroyed by an external stimulus. Specifically, in a case where the display device, in which the light diffusing sheet whose surface has a minute structure is provided on the forefront surface of the display device, is transported or assembled, the minute structure of the light diffusing sheet will be contaminated by dust etc. or will be damaged by an external stimulus. This makes it impossible for the light diffusing sheet to demonstrate performance as originally designed. This will also cause deterioration in optical property such as reflectivity as time goes on.

However, in the display device of the present invention, the minute light diffusing sections of the light diffusing sheet are not exposed in the forefront surface of the display screen of the display device. It is therefore possible to prevent the minute light diffusing sections on the forefront surface from, for example, being contaminated by dust etc. or being damaged during transporting or assembling the display device. That is, it is possible to provide a display device which (i) can demonstrate performance as originally designed and (ii) has an excellent viewing angle property.

In order to attain the object, a method of the present invention for producing a display device is arranged to be a method for producing a display device in which a light diffusing sheet is provided on a light exit surface side of a display screen, said method including the steps of: (i) forming the light diffusing sheet by forming, on a substrate, a plurality of light diffusing sections each having an inverse tapered shape; and (ii) attaching the light diffusing sheet onto the display screen such that the substrate is located on the light exit surface side.

According to the method, it is possible to produce a display device which (i) can demonstrate performance as originally designed and (ii) has an excellent viewing angle property.

For a fuller understanding of the nature and advantages of the invention, reference should be made to the ensuing detailed description taken in conjunction with the accompanying drawings.

Advantageous Effects of Invention

In a display device of the present invention, minute light diffusing sections of a light diffusing sheet are not exposed in a forefront surface (a light exit surface) of a display screen of the display device. It is therefore possible to prevent the minute light diffusing sections on the forefront surface from, for example, being contaminated by dust etc. or being damaged during transporting or assembling the display device. That is, it is possible to provide a display device which (i) can demonstrate performance as originally designed and (ii) has an excellent viewing angle property.

BRIEF DESCRIPTION OF DRAWINGS

(a) of FIG. 3 is a cross-sectional view of a light diffusing sheet which has not been provided in the display device.

(b) of FIG. 3 is a cross-sectional view of the display device in which the light diffusing sheet is provided.

(a) of FIG. 5 is a view illustrating a step of forming a light diffusing layer on a substrate.

(b) of FIG. 5 is a view illustrating a step of exposing the light diffusing layer via a photomask.

(c) of FIG. 5 is a view illustrating a developing step.

DESCRIPTION OF EMBODIMENTS

Schematic Configuration of Display Device 1 Including Light Diffusing Sheet 10

Figure 2:
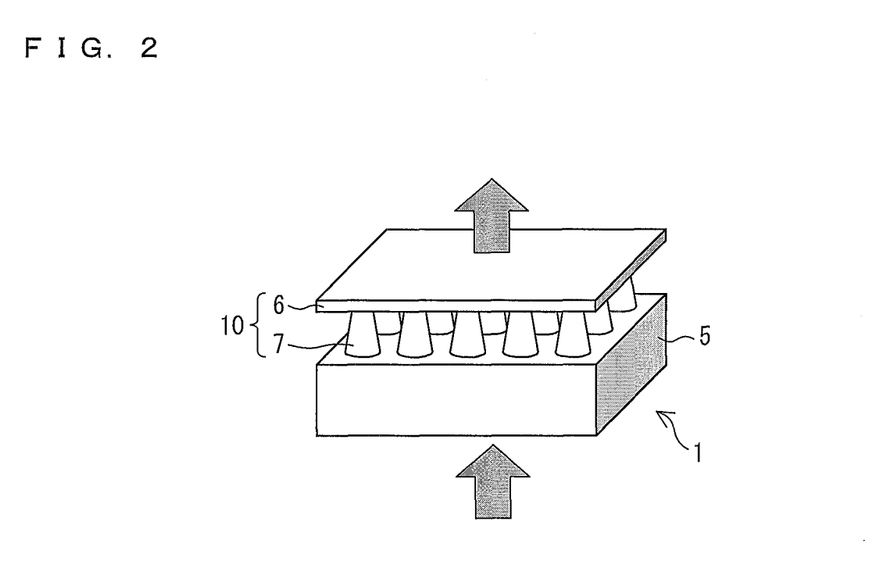
FIG. 2 is a perspective view illustrating an entire configuration of the display device of the embodiment of the present invention.

The following description will schematically discuss a display device, which includes a light diffusing sheet of the present embodiment, with reference to FIG. 2. FIG. 2 is a perspective view illustrating an entire configuration of a display device 1 including a light diffusing sheet 10.

The display device 1 includes the light diffusing sheet 10 and a display section 5 (see FIG. 2). The light diffusing sheet 10 includes a substrate 6 and a plurality of light diffusing sections 7 each of which has a trapezoidal cross section. The display section 5 includes a backlight section and a liquid crystal display element section. The backlight section includes (i) a light source such as a light emitting diode or a cold-cathode tube and (ii) a light guide plate for guiding, toward the liquid crystal display element section, light which is emitted from the light source and is subjected to internal reflection in the light guide plate. The liquid crystal display element section includes a liquid crystal panel. The light diffusing sheet 10 is provided on a front surface of a display screen of the display device 1 such as a liquid crystal display device. Specifically, the light diffusing sheet 10 is employed to increase a viewing angle, by diffusing light which is (i) emitted toward the display screen by, for example, a backlight of the display device 1 and (ii) directed toward a viewer. It is desirable that a backlight (so called a directional backlight) which controls a direction, in which light is emitted, so that the light has directivity, is employed as the backlight of the present embodiment. It is preferable that the directional backlight emits collimated or substantially collimated light which enters the light diffusing sheet 10. Linear films provided in a blind manner (which are called "louver") can be provided between the light source and the light diffusing sheet 10, in a case where the display device 1 includes the light diffusing sheet 10.

The light emitted from, for example, the backlight enters the plurality of light diffusing sections 7, and then outgoes from the substrate 6 via the plurality of light diffusing sections 7. Note that an air gap is secured between any adjacent light diffusing sections 7. Light, which has entered the light diffusing sheet 10, passes through the plurality of light diffusing sections 7 while being subjected to total reflection at an interface between the respective plurality of light diffusing sections 7 and the respective air gaps. Then, the light outgoes from a light exit surface. The total reflection is caused by a difference in refractive index between the respective plurality of light diffusing sections 7 and the respective air gaps. Each of the plurality of light diffusing sections 7 has an inclined side surface. Therefore, the light which has entered the light diffusing section 7 is diffused by the inclined side surface at all angles. This causes an improvement in light diffusivity of the light diffusing sheet 10.

The light diffusing sheet 10 of the present embodiment is configured by forming, on the substrate 6, the plurality of light diffusing sections 7 each of which has an inverse tapered shape. The "inverse tapered shape" refers to a shape in which the light diffusing section 7 has a width which becomes broader, as it is farther away from a region where the light diffusing section 7 is in contact with the substrate 6. That is, the light diffusing section 7 has the narrowest width in such a region. According to the display device 1, the light diffusing sheet 10 is provided on a front surface of the display section 5 such that the substrate 6 is located on a viewer side (that is, on a light exit side). It follows that the substrate 6 covers a forefront surface (light exit surface) of the display device 1. That is, the plurality of minute light diffusing sections 7 of the light diffusing sheet 10 are not exposed in the forefront surface of the display device 1. It is therefore possible to prevent the plurality of minute light diffusing sections 7 from being destroyed by external friction etc. during carrying, assembling, or using the display device 1.

Configuration of Display Device 1 Including Light Diffusing Sheet 10

Figure 1:
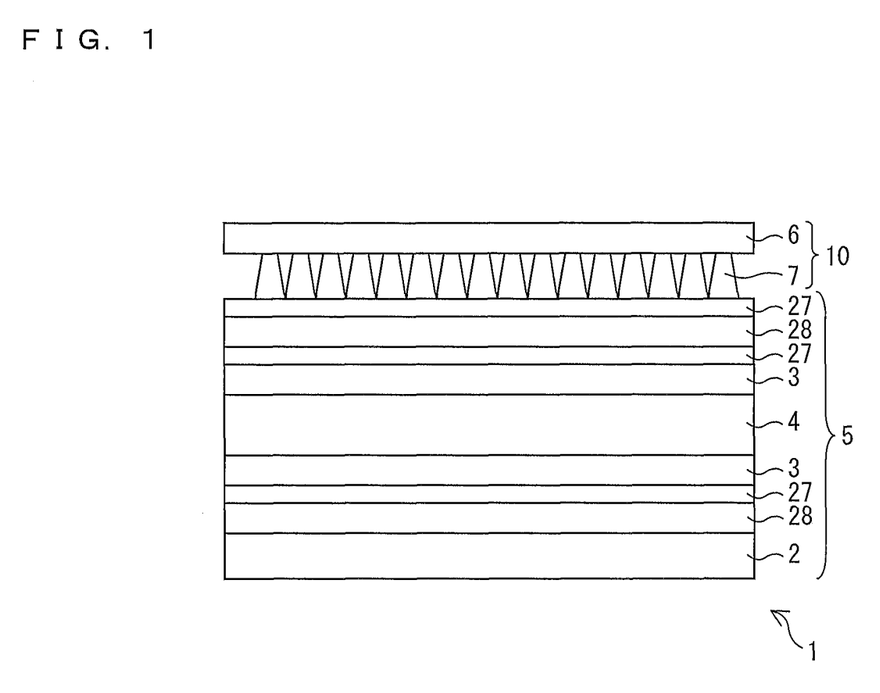
FIG. 1 is a cross-sectional view of a display device in accordance with an embodiment of the present invention.

The following description will discuss in detail the configuration of the display device 1 including the light diffusing sheet 10, with reference to FIG. 1. FIG. 1 is a cross-sectional view of the display device 1.

As early described, the display device 1 includes the light diffusing sheet 10 and the display device 5. In the display section 5, a backlight 2 such as a light emitting diode (LED), a semiconductor laser (LD) or a cold-cathode luminescent lamp (CCFL) is employed as the backlight section (see FIG. 1). In the display section 5, the liquid crystal panel is employed as the liquid crystal display element section. The liquid crystal panel is provided so that (i) a liquid crystal layer 4 is sealed between (a) a first glass substrate 28 (a first glass substrate) on which thin film transistors (TFTs) or wires etc. are formed and (b) a second glass substrate 28 (a second glass substrate) on which a transparent electrode or a color filter etc. is formed and (ii) polarizing plates 3 (first and second polarizing plates) are provided on the first and second glass substrates 28 via respective adhesive layers 27 (first and second adhesive layer).

Figure 3:
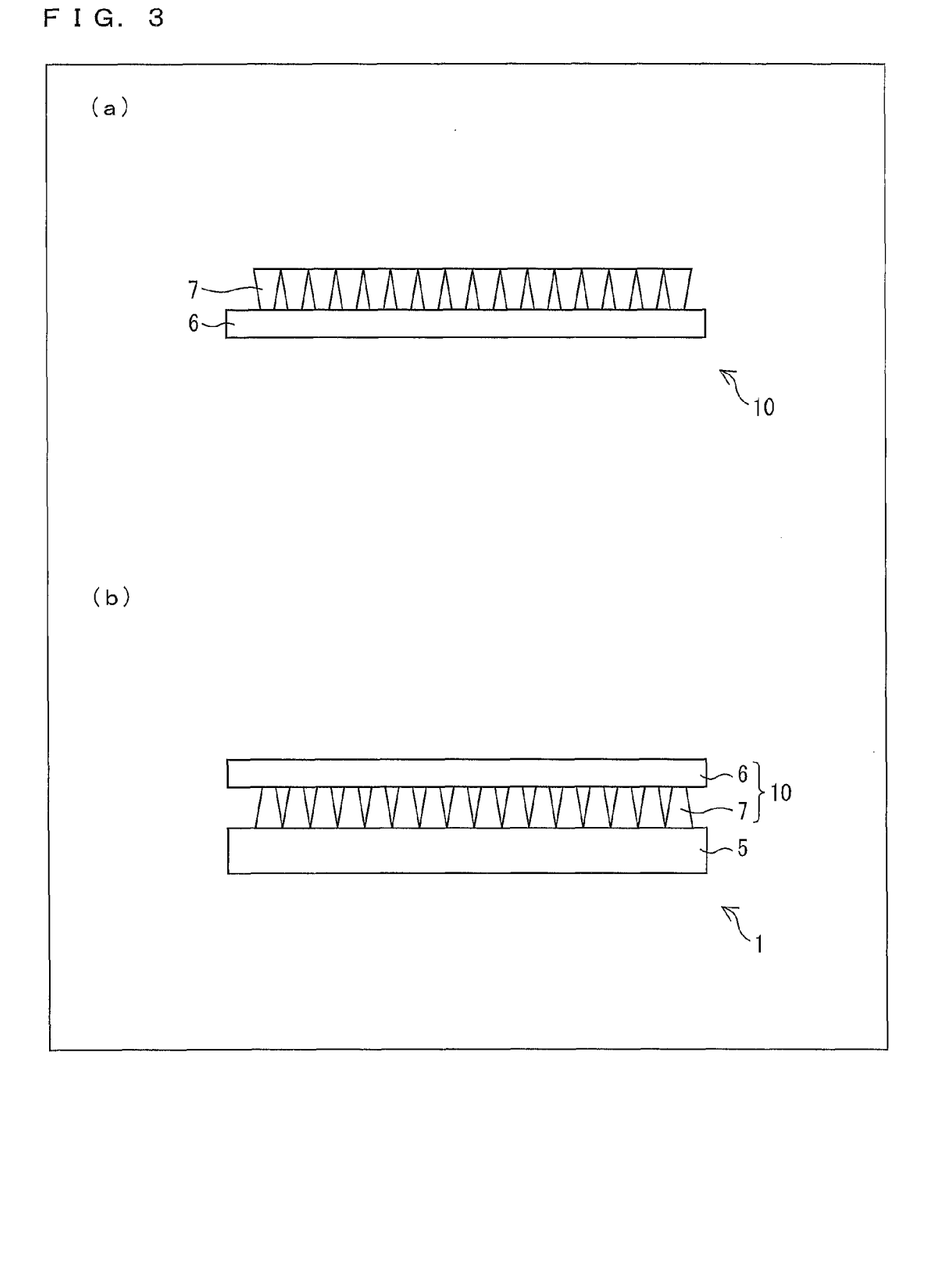

FIG. 3 shows in detail the light diffusing sheet 10. (a) of FIG. 3 is a cross-sectional view of the light diffusing sheet 10 which has not been attached to the display device 1. (b) of FIG. 3 is a cross-sectional view of the display device 1 to which the light diffusing sheet 10 has been attached.

The light diffusing sheet 10 is configured by forming, on the substrate 6 made of a material such as glass or transparent resin, the plurality of light diffusing sections 7 each of which has a trapezoidal cross section (see (a) of FIG. 3). Each of the plurality of light diffusing sections 7 has an inverse tapered shape. That is, the cross-sectional shape of the light diffusing section 7 is a trapezoid whose lower base is shorter than an upper base. The light diffusing sheet 10 is turned upside down, and then the plurality of light diffusing sections 7 of the light diffusing sheet 10 are attached onto the front surface (light exit surface) of the display section 5 via an adhesive layer 27 (see (b) of FIG. 3). It is more preferable to arrange edge parts of the plurality of light diffusing sections 7 to each other, which edge parts are located on a polarizing plate 3 side, so that the adhesive layer 27 is prevented from getting into an air gap region between any adjacent light diffusing sections 7.

The light diffusing sheet 10, in which the plurality of light diffusing sections 7 each having the inverse tapered shape are formed on the substrate 6, is thus provided on the forefront surface of the display section 5 such that the substrate 6 is located on a viewer side (that is, the light exit surface). It follows that the forefront surface of the display device 1 is covered by the substrate 6. In other words, the plurality of minute light diffusing sections 7 of the light diffusing sheet 10 are not exposed in the forefront surface of the display device 1. This makes it possible to prevent the plurality of minute light diffusing sections 7 from, for example, being contaminated by dust etc. or being damaged during transporting or assembling the display device 1. It is therefore possible to produce a display device 1 which (i) can demonstrate performance as originally designed and (ii) has an excellent viewing angle property.

It is preferable that each of the plurality of light diffusing sections 7 of the light diffusing sheet 10 has a conical or pyramid shape such as a conical shape or a quadrangular pyramid shape, provided that the cone or pyramid has no apex but has a trapezoidal cross section. The light diffusing section 7 having the conical or pyramid shape can diffuse, in all directions, light which has entered the light diffusing sheet 10. Oblique sides of the trapezoidal cross section of the light diffusing section 7 are not necessarily symmetrical, and can therefore be asymmetrical. Note that the oblique sides are not necessarily straight lines, and can therefore be curve lines.

Figure 4:
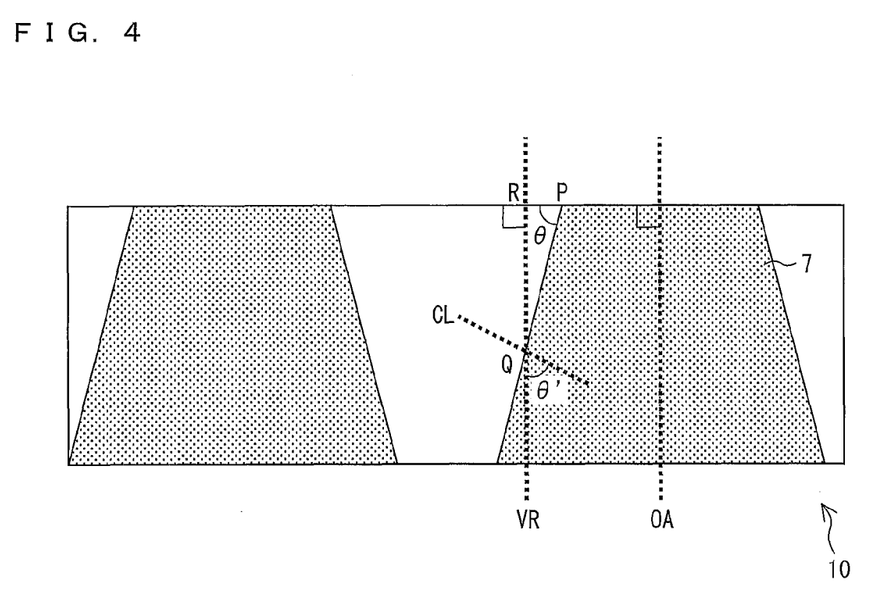
FIG. 4 is a view illustrating an angle of gradient of a light diffusing section of the light diffusing sheet in accordance with the embodiment of the present invention.

An angle between the respective oblique sides and the substrate 6, that is, an angle (hereinafter, referred to as an "inclination angle" of the light diffusing section 7) between a side surface of the light diffusing section 7 and the substrate 6 is set to an angle which allows light emitted from the backlight 2 to be subjected to total reflection. This will be described below more specifically with reference to FIG. 4. FIG. 4 is a view illustrating the inclination angle of the light diffusing section 7 of the light diffusing sheet 10. In FIG. 4, the substrate 6 is omitted so that the inclination angle of the light diffusing section 7 is easily understood.

An angle θ (an inclination angle of the light diffusing section 7) between a side surface and a light exit surface of the light diffusing section 7 is set to an angle θ' (unit: degree (°)), which is greater than a critical angle, between a normal line CL and an optical axis OA so that light which has entered the light diffusing section 7 in parallel with or substantially in parallel with the optical axis OA is subjected to total reflection. The inclination angle θ of the light diffusing section 7 can be represented by an angle QPR, where P represents a point where the side surface of the light diffusing section 7 intersects with the light exit surface, Q represents a point where incident light VR, parallel to the optical axis OA, enters the air gap region, and R represents a point where the light exit surface intersects with a perpendicular line which is perpendicular to the light exit surface and which is a line through the point Q. In this case, an angle PQR is represented by (90−θ)°. Therefore, the inclination angle θ of the light diffusing section 7 is equal to an incident angle θ' of the incident light VR at the point Q. That is, the inclination angle θ of the light diffusing section 7 is set to an angle greater than the critical angle. It is more preferable that the plurality of light diffusing sections 7 are provided at equal intervals or randomly such that (i) at least one light diffusing section 7 is included in a pixel that is a constitutional unit of the display screen of the display device 1 and (ii) a maximum one of distances between respective adjacent light diffusing sections 7 is smaller than intervals at which pixels are provided in the display device 1. This makes it possible for a display device, such as a mobile device, in which pixels are provided at small intervals to have a display screen with a wide viewing angle.

Some conventional light diffusing sheets are configured so that a light absorbing section, such as a light absorber, is provided in an air gap region between respective adjacent light diffusing sections. With the configuration, the light absorbing section functions to absorb (i) stray light which has entered a conventional light diffusing sheet or (ii) stray light which is generated in the conventional light diffusing sheet. The provision of the light absorbing section makes it possible to suppress a decrease in front contrast or image blur which is caused by leakage of stray light. Note that, in a case where the display device 1 of the present embodiment employs a directional backlight as the backlight 2, light emitted from the backlight 2 has directivity. It is therefore possible to eliminate a generation of stray light in the display device 1. This allows the display device 1 to have a wide viewing angle while suppressing a decrease in front contrast or image blur without providing a light absorbing section in the air gap region between respective adjacent light diffusing sections 7 in the light diffusing sheet 10. Since there is no need to provide any light absorbing section, it is possible not only to improve an extraction efficiency of light which has entered the light diffusing sheet 10 but also to reduce cost for producing the light diffusing sheet 10.

There can be provided, on a light exit surface side of the light diffusing sheet 10, at least one of a reflection preventing layer, a hard coat layer, a polarizing filter layer, an antistatic layer, an antidazzle processing layer, and an antifouling processing layer. With the configuration, it is possible to (i) suppress an influence of external light reflection, (ii) protect the light diffusing sheet 10 from dust etc., and/or (iii) add functions such as those for preventing the light diffusing sheet 10 from being damaged, in accordance with type(s) of layer(s) to be provided on the light exit surface side of the light diffusing sheet 10. It is therefore possible to prevent the light diffusing sheet 10 from having a deteriorated property.

Method for Producing Light Diffusing Sheet 10

Figure 5:
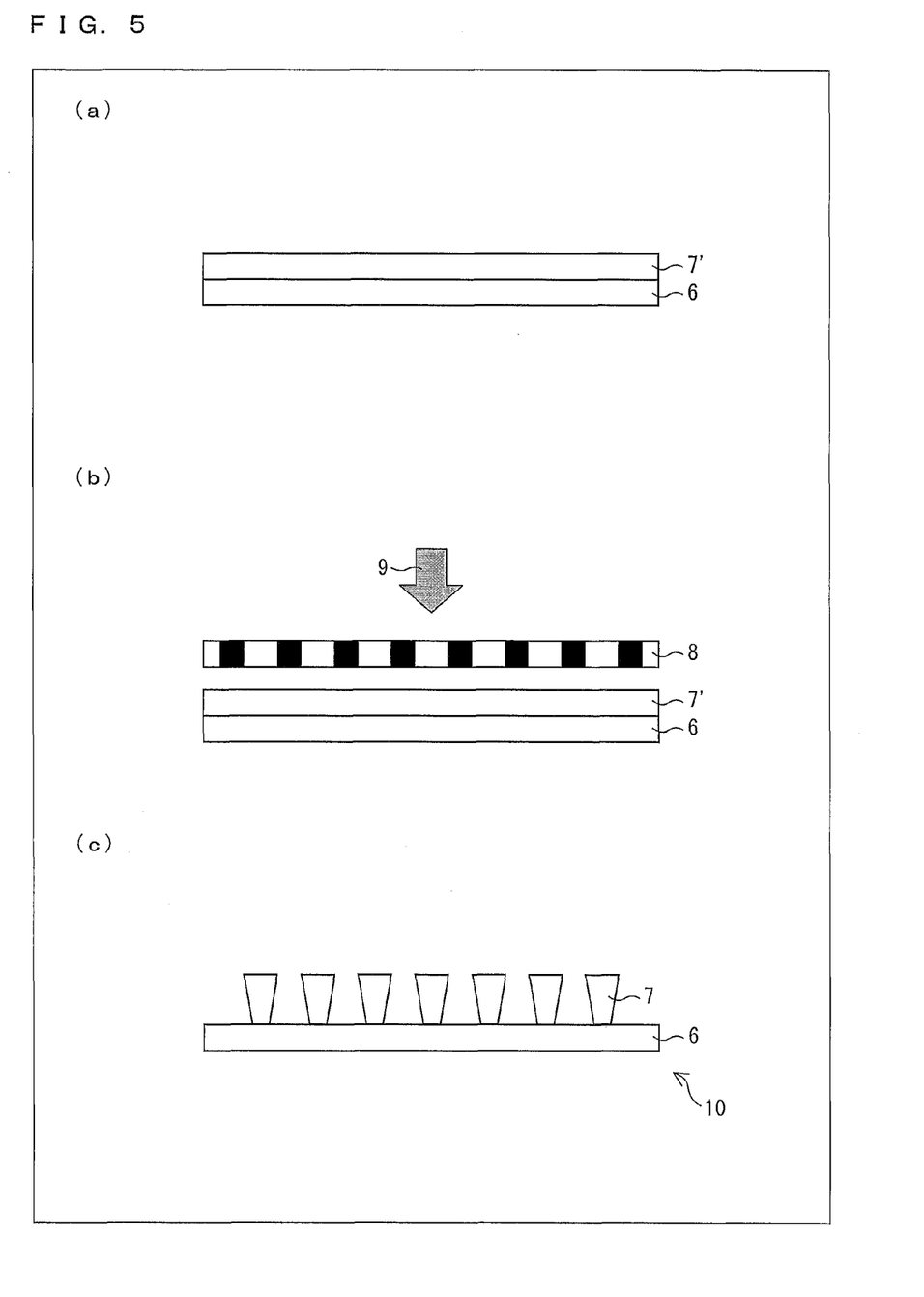

The following description will discuss in detail a method for producing the light diffusing sheet 10. As early described, the light diffusing sheet 10 is configured by forming, on the substrate 6, the plurality of light diffusing sections 7 each of which has the inverse tapered shape. The plurality of light diffusing sections 7 can be produced by means of, for example, photolithography. An example will be described below, with reference to FIG. 5, as to how to form the plurality of light diffusing sections 7 by means of photolithography. (a) of FIG. 5 is a view illustrating a step of forming a light diffusing layer 7' on a substrate 6. (b) of FIG. 5 is a view illustrating a step of exposing the light diffusing layer 7' via a photomask 8. (c) of FIG. 5 is a view illustrating a developing step.

First, a photosensitive resist is applied onto a whole surface of the substrate 6 which is transparent by means of spin coating so that the light diffusing layer 7' having a thickness of 20 μm is deposited on the substrate 6 (see (a) of FIG. 5). Examples of the photosensitive resist include a polyimide photosensitive resist and a novolac photosensitive resist. The photosensitive resist can be of a liquid type or can be of a sheet type. Examples of a material for the substrate 6 include glass, a cellulose triacetate (TAC) film, and a polyethylene phthalate (PET) film. Note that an image is more likely to blur as thicknesses of the substrate 6 and the light diffusing layer 7' are increased. It is therefore preferable that the substrate 6 and the light diffusing layer 7' each have a thickness which does not cause lessening function of the light diffusing sheet 10.

Figure 6:
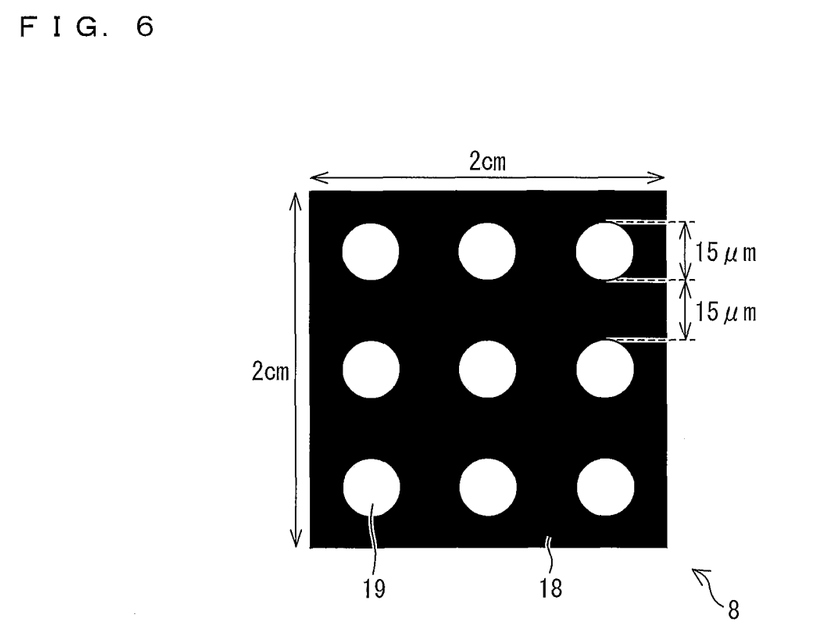
FIG. 6 is a view exemplifying a shape of the photomask.

Subsequently, the light diffusing layer 7' is exposed from above (in a direction indicated by an arrow 9 in (b) of FIG. 5), via the photomask 8 (see (b) of FIG. 5). FIG. 6 exemplifies a shape of a photomask 8 which is used in a case where the light diffusing layer 7' is formed by use of a negative photosensitive resist. In this case, an exposed part of the light diffusing layer 7' is cured, and an unexposed part of the light diffusing layer 7' is removed during developing of the light diffusing layer 7'. In view of the circumstances, the photomask 8 having circular exposure parts 19 is employed (see FIG. 6). For example, in a case where the photomask 8 with a size of 2 cm×2 cm has circular exposure parts 19 each of which has a diameter of 15 μm, intervals, at which the circular exposure parts 19 are arranged, are set to 15 μm. Note, however, that this is illustrative only, and the photomask 8 is therefore not limited to this. The photomask 8 illustrated in FIG. 6 is assumed to employ the negative photosensitive resist. It goes without saying that a photomask having a shape different from that of the photomask 8 illustrated in FIG. 6 is employed in a case where a positive photosensitive resist is employed.

Lastly, extra parts are washed away by developing the light diffusing layer 7' which has been exposed. Thus, a plurality of light diffusing sections 7 are formed (see (c) of FIG. 5). The developing causes each of the plurality of light diffusing sections 7 to have an inverse tapered conical shape in which its width becomes gradually wider from bottom up (see (c) of FIG. 5). The inverse tapered conical shape is achieved by use of, for example, a dedicated photosensitive resist such as a commercially available resist whose resist shape is designed to have an inverse tapered conical shape. Alternatively, the inverse tapered conical shape is achieved by, for example, stopping exposure before a photosensitive resist is completely cured and then carrying out a developing step. According to such a method, a surface of the photosensitive resist has a high degree of cure. In contrast, a base of the photosensitive resist has a low degree of cure. Thus, the inverted tapered conical shape is achieved. In the end, the plurality of light diffusing sections 7 can have an improved physical property and an improved strength, by being baked. The light diffusing sheet 10 is thus prepared.

The light diffusing sheet 10 thus prepared is directly attached to a forefront surface of a display section 5 via the adhesive layer 27. A display device 1 is thus prepared. The description has exemplified how to prepare the plurality of light diffusing sections 7 each of which has an inverse tapered conical shape. However, the present embodiment is not limited particularly to the inverted tapered conical shape. Each of the plurality of light diffusing sections 7 can have any conical or pyramid shape, as early described. It is possible to employ a photomask 8 having light shielding parts 18 or exposure parts 19 which allows a plurality of desired light diffusing section 7 to be achieved.

Modification 1

According to the above-described embodiment, the plurality of light diffusing sections 7 are arranged in the light diffusing sheet 10. In a case where the display device 1 employs the light diffusing sheet 10, a striped pattern (moire) is sometimes visible on the display screen. This is because a visible striped pattern (moire) is generated by displacement of cyclical patterns of respective regularly repeated patterns when they are superimposed. Therefore, in a case where the display device 1 employs a light diffusing sheet 10 having a cyclical pattern in which a plurality of light diffusing sections 7 are linearly arranged, clear moire will be sometimes caused by the cyclical pattern of the plurality of light diffusing sections 7 and a cyclical pattern of pixels of a display screen.

Figure 7:
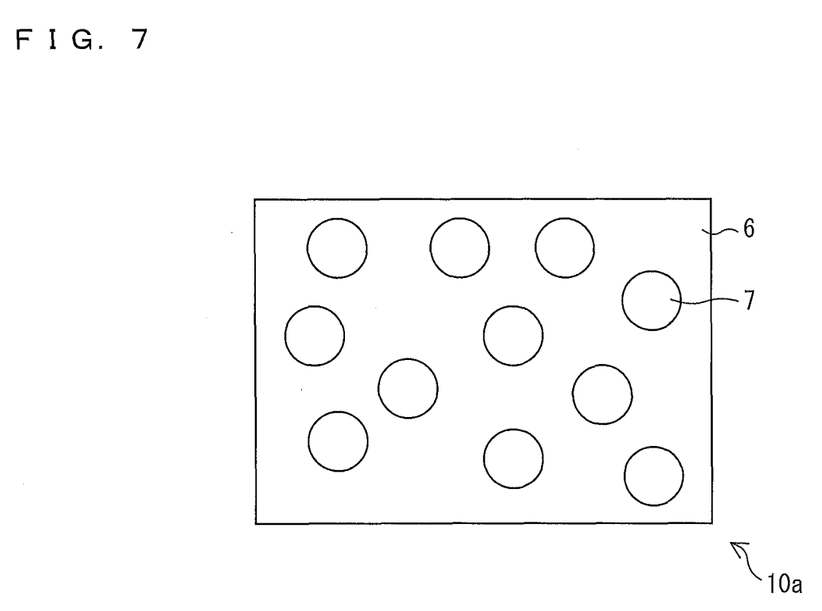
FIG. 7 is a view illustrating a light diffusing sheet in accordance with an embodiment of the present invention, which view is obtained when the light diffusing sheet is viewed from a side opposite to a viewer side.

In order to prevent the moire, a plurality of light diffusing sections 7 can be randomly provided like a light diffusing sheet 10a illustrated in FIG. 7. FIG. 7 is a view illustrating the light diffusing sheet 10a which view is obtained when the light diffusing sheet 10a is viewed from a side opposite to a viewer side.

According to the light diffusing sheet 10a, the plurality of light diffusing sections 7 are randomly provided (see FIG. 7), and therefore a distance between respective adjacent ones of the plurality of light diffusing sections 7 is not uniform. According to the light diffusing sheet 10a, the plurality of light diffusing sections 7 are not provided in accordance with a regular cyclical pattern. It is therefore possible to prevent moire from occurring on the display screen even in a case where the display device 1 employs such a light diffusing sheet 10a. This allows an improvement in display quality of the display device 1.

Note that Modification 1 is identical to the above-described embodiment except that the plurality of light diffusing sections 7 of the light diffusing sheet 10a are randomly provided. Therefore, such identical configurations are not described here. Accordingly, the shape of the plurality of light diffusing sections 7 is not limited to a conical shape illustrated in FIG. 7, and can therefore be other conical or pyramid shapes.

Modification 2

According to the light diffusing sheet 10 of the present embodiment, the plurality of light diffusing sections 7 having an uniform shape are arranged. In a case where the display device 1 employs such a light diffusing sheet 10, display unevenness is sometimes visible on the display screen, depending on a visible angle. This is because, in a case where the plurality of light diffusing sections 7 have a uniform shape, (i) luminance becomes high at a certain light exit angle and bright display is visible at a certain viewing angle, whereas (ii) display unevenness is observed on the display screen depending on a viewing angle when the display screen is viewed at a different viewing angle. This causes unevenness of viewing angle characteristics when a visible angle for the display screen changes to a horizontal direction or a vertical direction.

Figure 8:
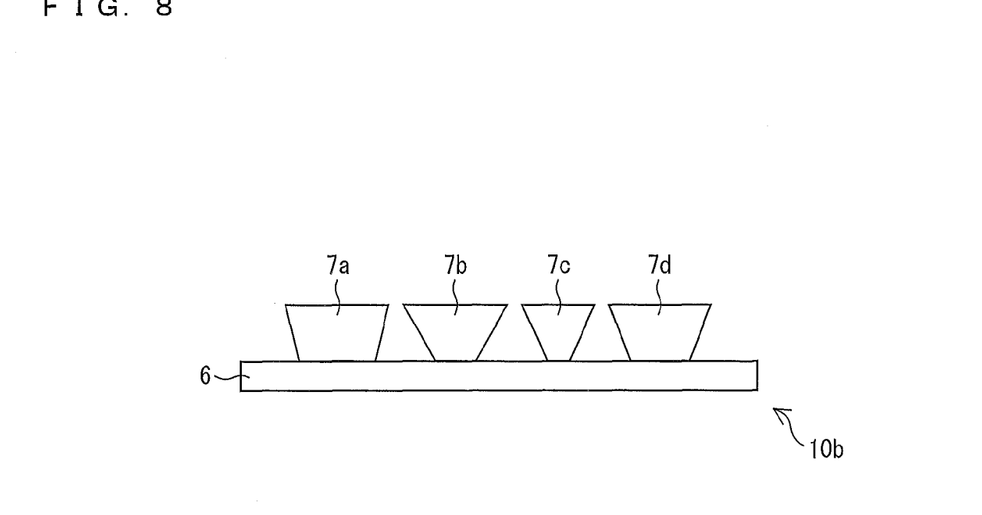
FIG. 8 is a cross-sectional view of a light diffusing sheet in accordance with an embodiment of the present invention.

In order to address such unevenness, light diffusing sections 7a through 7d, which have respective different side surface inclination angles and respective different bottom surface size, can be provided like a light diffusing sheet 10b illustrated in FIG. 8. FIG. 8 is a cross-sectional view of the light diffusing sheet 10b.

According to the light diffusing sheet 10b, there are provided the light diffusing sections 7a through 7d which have the respective different side surface inclination angles and the respective different bottom surface size (see FIG. 8). That is, there are provided the light diffusing sections 7a through 7d which have respective different side surface gradients and respective different surface areas contacting a substrate 6. The light diffusing sections 7a through 7d can be achieved, in an exposure step, by (i) employing a photomask having a plurality of light transmitting parts having respective different size and (ii) locally changing, on the substrate 6, an angle at which light emitted from a light source of an exposure device enters a light diffusing layer 7'. This can be achieved by employing a method 1, a method 2, or a method 3. According to the method 1, (i) the light source is provided to be inclined while the substrate 6 is being fixed on a horizontal surface and (ii) an inclination of the light source is changed as time goes on. According to the method 2, (i) the substrate 6 is provided to be inclined while the light source is being fixed on the horizontal surface and (ii) an inclination of the substrate 6 is changed as time goes on. According to the method 3, (i) light emitted from the light source of the exposure device is converged by use of an optical system such as a lens and (ii) a converging angle of the light is changed as time goes on. Note, however, that the Modification 2 is not limited to the methods 1 through 3. The light diffusing sections 7a through 7d having the respective different side surface inclination angles can be thus achieved. Note that each of the side surface inclination angles of the respective light diffusing sections 7a through 7d is an angle which meets a condition under which light emitted from the backlight of the display device is subjected to total reflection.

According to the light diffusing sheet 10b, the inclination angles of the side surfaces of the respective light diffusing sections 7a through 7d provided on the substrate 6 become non-uniform, and angles at which light that has entered the light diffusing sheet 10b is subjected to total reflection become non-uniform. That is, the angles at which the light is subjected to total reflection are compensated for each other. Therefore, in a case where a display device employs a light diffusing sheet 10b, light emitted from a backlight of the display device is diffused in all directions via the light diffusing sheet 10b. This makes it possible to (i) eliminate unevenness of viewing angle characteristics of the display device and (ii) smoothly change luminance of the display device.

Modification 2 is identical to the above-described embodiment except that the light diffusing sections 7a through 7d of the light diffusing sheet 10b have respective different shapes. Therefore, such identical configurations are not described here.

Modification 3

Figure 9:
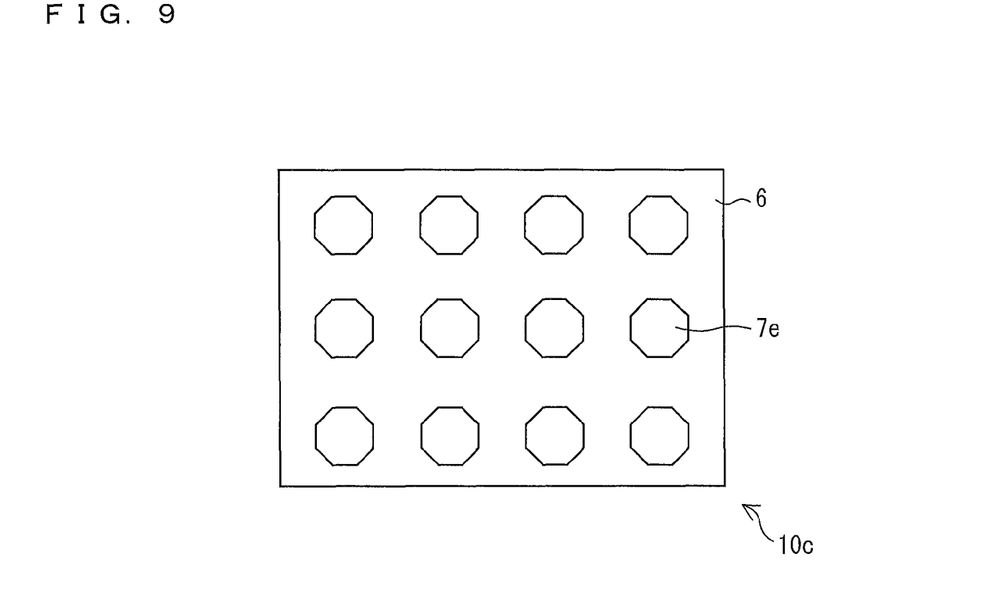
FIG. 9 is a view illustrating a light diffusing sheet in accordance with an embodiment of the present invention, which view is obtained when the light diffusing sheet is viewed from a side opposite to a viewer side.

As early described, the plurality of light diffusing sections 7 can have any conical or pyramid shapes. For example, a plurality of light diffusing sections 7e each having a pyramid shape can be provided like a light diffusing sheet 10c illustrated in FIG. 9. FIG. 9 is a view illustrating the light diffusing sheet 10c which view is obtained when the light diffusing sheet 10c is viewed from a side opposite to a viewer side.

The plurality of light diffusing sections 7e each of which has an octagonal pyramid shape are provided in the light diffusing sheet 10c (see FIG. 9). The plurality of light diffusing sections 7e are formed by exposing a light diffusing layer 7' provided on a substrate 6 by use of a photomask 8 having respective octagonal exposing sections 19 each of which has a cross sectional shape identical to those of the plurality of light diffusing sections 7e. Thus, the light diffusing sheet 10c is formed. Each of the plurality of octagonal exposing sections 19 has eight sides which make first through fourth pairs of sides in a case where each of the first through fourth pairs consists of two sides parallel to each other. The first through fourth pairs of sides face, respectively, (i) in a direction parallel to an x axis (direction in which longer sides of the substrate 6 in FIG. 9 extend), (ii) in a direction parallel to a y axis (direction in which shorter sides of the substrate 6 in FIG. 9 extend), (iii) in a direction at an angle (an angle measured counterclockwise from the x axis) of 45° with the x axis, and (iv) in a direction at an angle of 135° with the x axis. This allows the plurality of light diffusing sections 7e each of which has an octagonal pyramid shape to be thus achieved.

According to the light diffusing sheet 10c, since each of the plurality of light diffusing sections 7e has an octagonal pyramid shape. As such, light, which has entered the light diffusing sheet 10c, is diffused by the light diffusing sheet 10c intensively in an up-and-down direction, in a left-and-right direction, and in an oblique direction at an angle of 45° to the light diffusing sheet 10c. Note that, according to the light diffusing sheet 10, light, which has entered the light diffusing sheet 10, exits from the light diffusing sheet 10 in all directions. On the contrary, according to a display device which employs a light diffusing sheet 10c, first through fourth pairs of sides of an octagonal cross section of each light diffusing section 7e face, respectively, in a direction parallel to the x axis, in a direction parallel to the y axis, in a direction at an angle of 45° with the x axis, and in a direction at an angle of 135° with the x axis. As such, the light which has entered the light diffusing sheet 10c is diffused intensively in the four directions. This allows an improvement in viewing angle characteristic of the display device in an up-and-down direction, in a left-and-right direction, and in an oblique direction at an angle of 45° to the display surface, which directions are regarded as important for display devices.

Modification 3 is identical to the above-described embodiment except that the plurality of light diffusing sections 7e each of which has the octagonal pyramid shape are provided in the light diffusing sheet 10c. Therefore, such identical configurations are not described here. Modification 3 describes the plurality of light diffusing sections 7e each of which bottom surfaces is an octagonal shape. However, the shape of the bottom surfaces of the plurality of light diffusing sections 7e is not limited to the octagonal shape. It goes without saying that each of the plurality of light diffusing sections 7e may be a pyramid having a bottom surface whose shape is a polygon other than an octagon.

Modification 4

Figure 10:
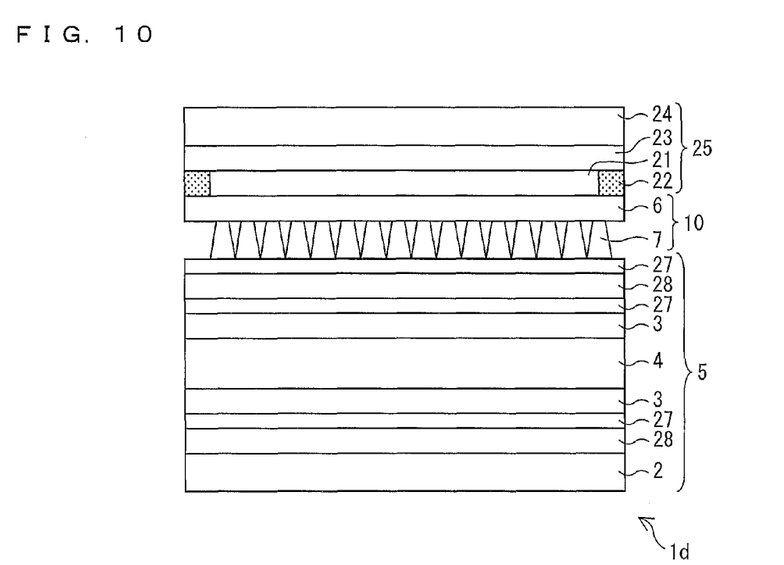
FIG. 10 is a cross-sectional view of a display device in accordance with an embodiment of the present invention.

The light diffusing sheets 10, and 10a through 10c each are usually attached onto a forefront surface of a display device such as a liquid crystal display device. Instead, the light diffusing sheets 10, and 10a through 10c each can also be attached to a touch panel display device such as a display device 1d illustrated in FIG. 10. FIG. 10 is a cross-sectional view of the display device 1d.

According to the display device 1d, a touch panel section 25 is provided on a light exit surface side of a light diffusing sheet 10 that is attached onto a forefront surface of a display section 5 (see FIG. 10). Examples of the touch panel section 25 encompass an electrostatic capacitive coupling-type touch panel disclosed in Japanese Patent Application Publication, Tokukai, No. 2008-32756 A. Specifically, the touch panel section 25 is provided on a substrate 6 of the light diffusing sheet 10 via an adhesive layer 22. Note that an air layer 21 is formed by the touch panel section 25, the adhesive layer 22, and the substrate 6. The touch panel section 25 includes a glass substrate 24 and a position detecting transparent electrode 23 provided on an entire surface of the glass substrate 24. The position detecting transparent electrode 23 includes (i) position detecting electrodes provided at regular intervals on a periphery of the position detecting transparent electrode 23 and (ii) a position detecting circuit for detecting a touched position.

The following description will briefly discuss operation principle of the touch panel section 25. According to the touch panel section 25, in a case where a front surface of a display screen, i.e., a position on a surface of the glass substrate 24 is touched, a part of the position detecting transparent electrode 23 which part corresponds to a touched position, is grounded via electrostatic capacitance of a human body. This causes a change in a resistance between ground points and the respective position detecting electrodes. By detecting such a change, the touch position detecting circuit detects the touched position on the surface of the glass substrate 24.

Note that, according to the display device 1d, the light diffusing sheet 10, provided on the forefront surface of the display device 5, is provided such that the substrate 6 is located on the light exit surface side. It is therefore possible to further provide the touch panel section 25 on the light exit surface side of the light diffusing sheet 10. Since the light diffusing sheet 10 is provided between the display section 5 and the touch panel section 25, a user can operate the display device 1d while viewing the display screen having a wide viewing angle. That is, a user can enter information by touching the display screen with a finger, a pen or the like while facing the display device 1d. Note that a touch panel applicable to the present embodiment is not limited to the electrostatic capacitive touch panel. Any touch panel such as a resistive film touch panel, an ultrasonic touch panel, and an optical touch panel is therefore applicable to the present embodiment.

Modification 4 has described the touch panel display device 1d including the light diffusing sheet 10. It goes without saying that the touch panel display device 1d can include the light diffusing sheet 10a, 10b or 10c instead of the light diffusing sheet 10. It is possible to provide a touch panel display device having a wide viewing angle characteristic even in a case where the touch panel display device includes the light diffusing sheet 10a, 10b or 10c.

The present invention is not limited to the description of the embodiment and modifications above, and can therefore be modified by a skilled person in the art within the scope of the claims. Namely, an embodiment derived from a proper combination of technical means disclosed in different embodiments is encompassed in the technical scope of the present invention.

The present embodiment has exemplified the liquid crystal display device as the display device. The display device is not limited to the liquid crystal display device. The present invention is applicable to an organic electroluminescence display device, a plasma display or like display device. Further, the present embodiment has described a case where the light diffusing sheet 10 is bonded above the polarizing plates 3 of the display device 5. However, the light diffusing sheet 10 does not necessarily contact the display section 5. An optical film, an optical component or the like may be provided between the light diffusing sheet 10 and the display device 5. Alternatively, the light diffusing sheet 10 may be distant from the display section 5 in the display device 1. In a case where the present invention is applied to the display device such as the organic electroluminescence display device or the plasma display, the polarizing plate 3 does not need to be provided in the display device. Therefore, the light diffusing sheet 10 never contacts the polarizing plate 3 in the display device such as the organic electroluminescence display device or the plasma display.

Summary of Embodiment

A display device of the present invention is configured such that the plurality of light diffusing sections are randomly provided on the substrate.

According to the configuration, the plurality of light diffusing sections are randomly provided in the light diffusing sheet, and therefore a distance between respective adjacent ones of the plurality of light diffusing sections is not uniform. According to the light diffusing sheet, the plurality of light diffusing sections are not provided in accordance with a regular cyclical pattern. It is therefore possible to prevent moire from occurring on a display screen of the display device even in a case where the display device employs the light diffusing sheet. This allows an improvement in display quality of the display device.

The display device of the present invention is configured such that an area of a surface of at least one of the plurality of light diffusing sections, which surface contacts the substrate, is different from those of the others of the plurality of light diffusing sections.

According to the configuration, angles at which light that has entered the light diffusing sheet is subjected to total reflection become non-uniform. That is, the angles at which the light is subjected to total reflection are compensated for each other. Therefore, light emitted from a backlight of the display device is diffused in all directions via the light diffusing sheet. This makes it possible to (i) eliminate unevenness of viewing angle characteristics of the display device and (ii) smoothly change luminance of the display device.

The display device of the present invention is configured such that a gradient of a side surface of at least one of the plurality of light diffusing sections is different from those of the others of the plurality of light diffusing sections.

According to the configuration, angles at which light that has entered the light diffusing sheet is subjected to total reflection become non-uniform. That is, the angles at which the light is subjected to total reflection are compensated for each other. Therefore, light emitted from a backlight of the display device is diffused in all directions via the light diffusing sheet. This makes it possible to (i) eliminate unevenness of viewing angle characteristics of the display device and (ii) smoothly change luminance of the display device. Further, the plurality of light diffusing sections having respective different side surface gradients can diffuse light broadly. It is therefore possible to provide a display device having a wide viewing angle by use of the light diffusing sheet.

The display device of the present invention is configured such that a constitutional unit of an image to be displayed on the display screen is a pixel, and a maximum one of distances between respective adjacent ones of the plurality of light diffusing sections is smaller than intervals at which pixels are provided.

The configuration makes it possible for a display device, such as a mobile device, in which pixels are provided at small intervals to have a display screen with a wide viewing angle.

The display device of the present invention is configured such that each of the plurality of light diffusing sections has a circular or polygonal bottom surface.

According to the configuration, light that has entered the light diffusing sheet is omnidirectionaly diffused by the light diffusing sheet. It is therefore possible to omnidirectionally improve the viewing angle property of the display device.

The display device of the present invention is configured such that each of the plurality of light diffusing sections has an octagonal bottom surface.

According to the configuration, light that has entered the light diffusing sheet is diffused intensively in an up-and-down direction, in a left-and-right direction, and in an oblique direction at an angle of 45° to the light diffusing sheet. This allows an improvement in viewing angle characteristic of the display device in an up-and-down direction, in a left-and-right direction, and in an oblique direction at an angle of 45° to the display surface, which directions are regarded as important for display devices.

The display device of the present invention is configured such that there is provided, on a light exit surface side of the light diffusing sheet, at least one of a reflection preventing layer, a hard coat layer, a polarizing filter layer, an antistatic layer, an antidazzle processing layer, and an antifouling processing layer.

According to the configuration, it is possible to (i) suppress an influence of external light reflection, (ii) protect the light diffusing sheet from dust etc., and/or (iii) add functions such as those for preventing the light diffusing sheet from being damaged, in accordance with type(s) of layer(s) to be provided on the light exit surface side of the light diffusing sheet. It is therefore possible to prevent the light diffusing sheet from having a deteriorated property.

The display device of the present invention is configured to further include a touch panel which is provided on the light exit surface side of the light diffusing sheet.

According to the configuration, a user can operate the touch panel while viewing the display screen having a wide viewing angle. That is, a user can enter information by touching the display screen with a finger, a pen or the like while facing the display device.

The display device of the present invention is configured to further include a directional backlight, a first polarizing plate, a first glass substrate, a liquid crystal layer, a second glass substrate, and a second polarizing plate being provided, in this order, on a light exit surface side of a directional backlight, the light diffusing sheet being provided on a light exit surface side of the second polarizing plate.

According to the configuration, the display device of the present invention employs a backlight (so called a directional backlight) which controls a direction, in which light is emitted, so that the light has directivity. The directional backlight emits collimated or substantially collimated light. It is therefore possible to eliminate a generation of stray light in the display device of the present invention. This allows the display device to have a wide viewing angle while suppressing a decrease in front contrast or image blur. Since there is no need to provide, for example, a light absorbing section for absorbing stray light between respective adjacent light diffusing sections in the light diffusing sheet, it is possible not only to improve an extraction efficiency of light which has entered the light diffusing sheet but also to reduce cost for producing the light diffusing sheet.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to production of a light diffusing sheet which is used in a display device such as a liquid crystal display device to increase a viewing angle of the display device.

REFERENCE SIGNS LIST 1, 1d, and 11: display device
2: backlight
3 and 13: polarizing plate
4 and 14: liquid crystal layer
5 and 15: display section
6 and 16: substrate
7, and 7a through 7e: light diffusing section
7': light diffusing layer
8: photomask
10, 10a through 10c, and 20: light diffusing sheet
12: backlight
17: waveguide
18: light shielding section
19: exposing section
21: air layer
22: adhesive layer
23: position detecting transparent electrode
24: glass substrate
25: touch panel section
26: groove
27: adhesive layer
28: glass substrate

The invention claimed is:

1. A display device, comprising:
a display screen; and
a light diffusing sheet including:
a substrate; and
a plurality of light diffusing sections, randomly and independently provided on the substrate, each having a shape inversely tapered with respect to the substrate, an air gap being defined between each of the plurality of light diffusing sections and an adjacent one of the plurality of light diffusing sections; wherein
the light diffusing sheet is located on a light exit surface side of the display screen and the substrate is located on a light exit surface side of the display screen; and
the substrate is on a light exit surface side of the plurality of light diffusing sections.

2. The display device as set forth in claim 1, wherein an area of a surface of at least one of the plurality of light diffusing sections, which surface contacts the substrate, is different from those of the others of the plurality of light diffusing sections.

3. The display device as set forth in claim 1, wherein a gradient of a side surface of at least one of the plurality of light diffusing sections is different from those of the others of the plurality of light diffusing sections.

4. The display device as set forth in claim 1, wherein:
a constitutional unit of an image to be displayed on the display screen is a pixel, and a maximum one of distances between respective adjacent ones of the plurality of light diffusing sections is smaller than intervals at which pixels are provided.

5. The display device as set forth in claim 1, wherein each of the plurality of light diffusing sections has a circular or polygonal bottom surface.

6. The display device as set forth in claim 5, wherein each of the plurality of light diffusing sections has an octagonal bottom surface.

7. The display device as set forth in claim 1, wherein there is provided, on a light exit surface side of the light diffusing sheet, at least one of a reflection preventing layer, a hard coat layer, a polarizing filter layer, an antistatic layer, an antidazzle processing layer, and an antifouling processing layer.

8. The display device as set forth in claim 1, further comprising a touch panel which is provided on the light exit surface side of the light diffusing sheet.

9. The display device as set forth in claim 1, further comprising a directional backlight,
a first polarizing plate, a first glass substrate, a liquid crystal layer, a second glass substrate, and a second polarizing plate being provided, in this order, on a light exit surface side of a directional backlight,
the light diffusing sheet being provided on a light exit surface side of the second polarizing plate.

10. A method for producing a display device in which a light diffusing sheet is provided on a light exit surface side of a display screen,
said method comprising the steps of:
(i) forming the light diffusing sheet by randomly and independently forming, on a substrate, a plurality of light diffusing sections each having a shape inversely tapered with respect to the substrate, an air gap being defined between each of the plurality of light diffusing sections and an adjacent one of the plurality of light diffusing sections; and
(ii) arranging the substrate on a light exit side of the plurality of light diffusing sections and attaching the light diffusing sheet onto the display screen such that the substrate is located on a light exit surface side of the display screen.

* * * * *